2 Sheets-Sheet 1.

W. L. Williams,

Splitting Wood.

No. 869. Reissued Dec. 20, 1859.

Witnesses:
Lemuel W. Serrell.
Chas. H. Smith

Inventor:
W. L. Williams.

AM. PHOTO-LITHO. CO. N.Y. (OSBORNE'S PROCESS)

2 Sheets - Sheet 2.

W. L. Williams,

Splitting Wood.

No. 869.

Reissued Dec. 20, 1859.

Witnesses:
Lemuel W. Serrell.
Chas. E. Smith.

Inventor:
W. L. Williams.

AM. PHOTO-LITHO. CO. N.Y. (OSBORNE'S PROCESS)

UNITED STATES PATENT OFFICE.

WILLIAM L. WILLIAMS, OF NEW YORK, N. Y.

IMPROVED MACHINE FOR SPLITTING FIRE-WOOD.

Specification forming part of Letters Patent No. 23,734, dated April 19, 1859; Reissue No. 869, dated December 20, 1859.

*To all whom it may concern:*

Be it known that I, W. L. WILLIAMS, of the city, county, and State of New York, have invented certain new and useful Improvements in Machinery for Splitting Fire-Wood; and I do hereby declare that the following is a full, clear, and exact description of the same, reference being had to the annexed drawings, making a part of this specification, in which—

Figure 2:
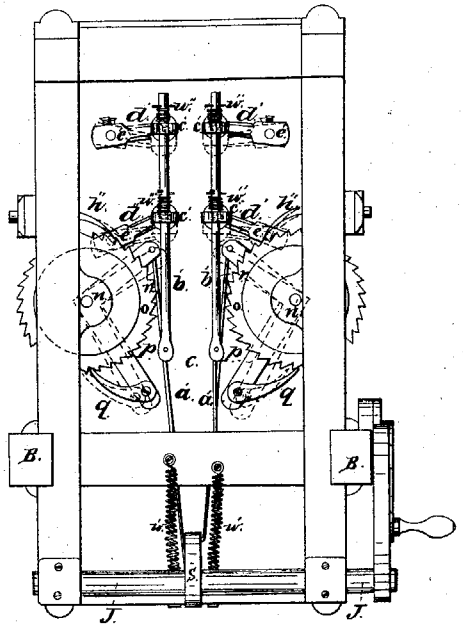
Figure 1:
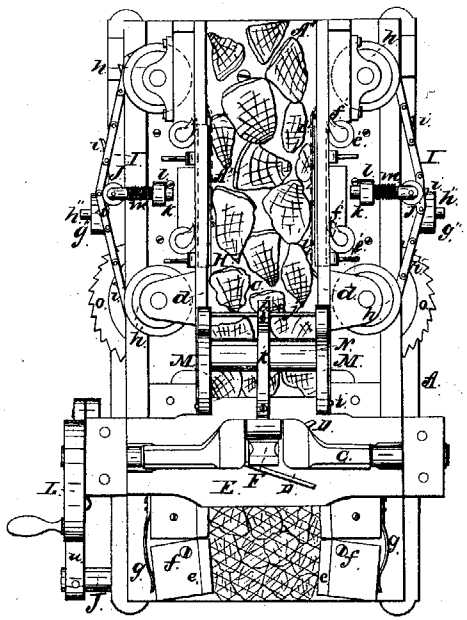
Figure 4:
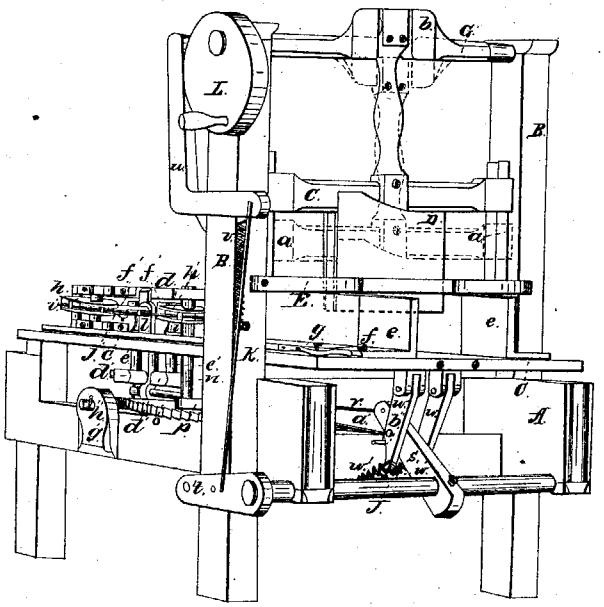
Figure 3:
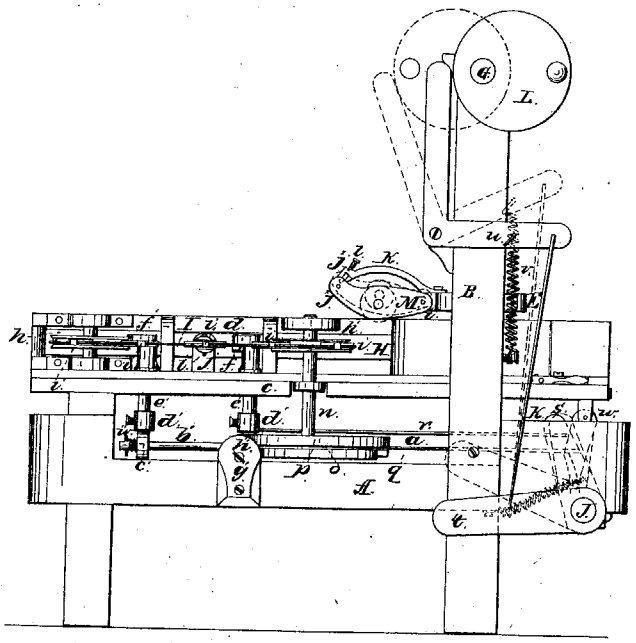

Figure 1 is a plan or top view of my invention. Fig. 2 is an inverted plan of the same. Fig. 3 is a side elevation of the same. Fig. 4 is a perspective view of the same.

Similar marks of reference denote like parts in all the figures.

This invention relates to an improvement on a machine for splitting fire wood for which Letters Patent were granted to me, bearing date April 14, 1857.

In feeding blocks to be split into fire or kindling wood great difficulty has heretofore existed in preventing the blocks, which are often of a wedge form, setting so tightly against each other that when the knife penetrates the wood some of the parts are broken or injured.

My invention consists in a device for feeding in the wood that will yield as the splitting progresses and relieve the parts from injury, rendering my machine durable and reliable, and obviating the difficulties heretofore experienced.

To enable those skilled in the art to fully understand and construct my machine, I will proceed to describe it.

A represents a rectangular frame, which may be so constructed in any proper way as to support the working parts.

B B are two uprights attached to the frame A, one at each side parallel with each other, in a transverse plane, and having a cross bar, C fitted between them. This cross-bar works between proper guides *a a*, attached to the inner sides of the uprights B B, and has a V-shaped knife, D, attached to it. This knife may be formed of one piece of steel, or of two pieces placed obliquely to each other and properly screwed to the bar C. The knife D works through a horizontal guide-plate, E, attached to the uprights B B, and it has a reciprocating motion given it by a pitman, F, and a crank, *b*, the latter being on a shaft, G, which has its bearings on the upper parts of uprights B B, and is clearly shown in Figs. 1 and 4.

H is a feed-box placed on the upper part of the frame A, and formed of a horizontal board or platform, *c*, and two side pieces, *d d*. This feed-box extends the whole length of the frame A, and at the outer or discharge ends two movable or yielding pieces, *e e*, are attached. These yielding pieces are equal in width and height to the pieces *d d*, and are secured to the platform or board *c*, each by a screw *f*, on which they work as centers, and each piece has a spring, *g*, bearing against it, said springs having a tendency to turn the pieces *e* within the line of the side pieces, *d d*. This will be clearly understood by reference to Fig. 1. To each side piece, *d*, of the feed-box H two horizontal pulleys, *h h'* are attached, and around the two pulleys of each side piece an endless chain, I, passes. These endless chains are each provided with spurs *i* at suitable distances apart, and the pulleys *h h'* are so placed relatively with the side pieces, *d d*, that the inner sides of the chains I will be about "flush" with the inner surfaces of the side pieces, the spurs *i* projecting their whole length within the feed-box. See Fig. 1. The endless chains are not fitted tightly on the pulleys *h*, but loosely, and the pressure-pulleys *j* bear against said chains, in order to keep them in proper position on the pulleys. These pressure-pulleys *j* are fitted in the ends of rods *k*, which are placed in suitable bearings, *l*, and allowed to slide therein, a spiral spring, *m*, being placed around each road *k*, said springs having a tendency to keep the pulleys *j* against the endless chains, as will be fully understood on reference to Fig. 1. The pulleys *h'* of the side pieces, *d d*, have their shaft *n* extending below the board or *n* there *c*, and on the lower part of each shaft platform is placed a ratchet, *o*, and just above this ratchet is placed a lever, *p*, to the outer end of one arm of which is attached a pawl, *q*, and to the outer end of each of the opposite arms of said levers is attached a rod, *r*. Both rods *r r* are connected to an arm, *s*, on a shaft, J, which is placed transversely in the frame A, and at its discharge-end. To one end of the shaft J is attached an arm, *t*, which is connected by a rod, K, with a bent lever, $u$, which is pivoted to one of the uprights B, and kept in contact with a cam, L, on the shaft G by a spring, $v$, as shown clearly in Fig. 3.

To the under side of the board or platform $c$, and at the discharge end of the machine, two jointed pendants, $w\,w$, are attached. (See Fig. 4.) To each pendant a rod, $a'$, is connected, said rods being also connected to rods $b'$, which are fitted in guides $c'$, that are attached to arms $d'$, said arms being secured to the lower ends of shafts $e'$, which pass vertically through the board or platform $c$, two at the outer side of each side piece, $d$. To the upper part of each shaft $e'$ a horizontal projecting spur, $f'$, is attached. To each pendant $w$ a spring, $w'$, is attached, and other springs $w''$ are placed on the rods $b'$, the use of which latter springs will be hereinafter described.

To each side of the frame A is secured a bearing, $g$, to receive retaining-pawls $h''$, which catch into the ratchets $o$. These pawls are allowed to slide in their bearings to a certain extent, and have spiral springs placed on them to keep the pawls engaged with the ratchets.

To the inner side of the guide-plate E a frame, M, is attached by joints $i'$. In this frame a roller, N, is placed, and in the outer end of said frame a rod, $j'$, is placed, which rod passes through a slot, $j^{\times}$, in the end of a bar, $k'$, attached to the plate E, a screw, $l'$, regulating the movement of the rod $j$ in said slot. (See Fig. 3.)

The operation is as follows: Motion is given to the shaft G in any proper manner, and a reciprocating motion is communicated to the knife D by the crank $b$ and connecting-rod F. Motion is also given to the chains I from the same shaft G by means of the cam L, lever $u$, arms $t\,s$ on shaft J, and the pawls $q$ of the lever $p$, said pawls actuating the ratchets $o$. The chains I feed the blocks $A^{\times}$ (shown in Fig. 1) to the knife D, the spurs $i$ of the chains catching into the blocks and insuring their forward movement. The spurs $i$ are made to catch into the blocks $A^{\times}$ by the projecting spurs $f'$ on the shafts $e'$, said spurs having an inward-turning movement given them by the operation of the rods $b'$, which are actuated by the pins $b''$ on the arm $s$ of the shaft J striking against the jointed pendant $w$. The spurs $f'$ press the chains I inward and clamp it snugly, thus insuring its forward movement to the knife D, which splits the block $A^{\times}$ at every descent. The chains I I prevent the blocks from binding against the side pieces, $d\,d$, of the feed-box and shove them bodily forward, and as each cut is made the blocks are allowed to yield a little backward, owing to the yielding retaining-pawls $h''$, the springs on said pawls permitting such result. The pulleys $j$ take up the slack of the chains I I as the projections $f'$ turn outward. The chains therefore are always retained in proper position on the pulleys $h\,h'$, and the chains are allowed to be acted upon or pressed laterally into the feed-box. The spurs $f'$ are also allowed to yield or give outward in consequence of the springs $w''$ on the rods $b'$.

It will be seen therefore that no part of the machine can be injured by the action of the knife D on the blocks, as the blocks are allowed to yield or give sufficiently to prevent such result.

By means of the turning and yielding end pieces $e\,e$ the split wood is supported and prevented falling over until it receives the second cut, and then is readily discharged, as said pieces will yield under a certain pressure and prevent the clogging or binding of the same at the discharge end of the feed-box, and at the same time said pieces $e\,e$ will retain the blocks to a certain extent, so as to sustain the block or blocks acted upon by the knife D—that is to say, they will prevent said block or blocks of wood $A^{\times}$ from falling over in front, a contingency which might otherwise occur.

The roller N prevents the blocks of wood $A^{\times}$ from rising or being curved upward under the action of the endless chains I I, and insures their passage under the plate E. The weight of the roller N will generally effect this result, but a spring may be applied if necessary.

Some elasticity is necessary in order to compensate for slight variations in the length of the blocks, and also to allow for any slight upward movement of the blocks, in order to prevent the binding or wedging of the same.

This device has been practically tested and operates very efficiently. The great difficulty attending the perfect operation of machines for splitting wood has been the irregular form of the blocks to be split, they only approximating uniformity in their length. This irregular form of the blocks favors their wedging or binding in the feed-box of the machines heretofore constructed, for in being led forward they are liable to be compressed tightly together, many of the blocks being, in fact, wedges or of wedge-shape, for the blocks, it will be understood, are sawed from split logs. By my invention this difficulty is avoided, for the blocks are grasped or compressed at each side of the feed-box by the chains, and are thus fed bodily forward.

I am aware that endless feeding-chains have been previously used for feeding blocks of wood to be split to the splitting-knives, and I do not claim, broadly, such device irrespective of the lateral movement herein described, for chains for this purpose may be seen in my patented machine previously alluded to. The knife D has also been used, and may be seen in the above-mentioned machine. I therefore do not herein claim said knife D; but, Having described my invention, what I claim as new, and desire to secure by Letters Patent, is—

1. Feeding the wood to be split by the endless chains I I, when so arranged that the chain can receive a lateral movement, for the purposes and as specified.

2. In combination with the endless chain to feed the wood as aforesaid, the rollers *j j* for permitting a lateral movement, and taking up any slack, as set forth.

3. The yielding pawls *h'' h''*, in combination with the feeding-chains I I, for permitting backward movement to the wood as the knife enters the same, thereby preventing the wedging of the wood or injury to the parts, as set forth.

4. The spurs *f''*, to give lateral motion to the chains I I, in combination with the arms *d'* and yielding connection to the rods *b' b'*, as described and shown.

5. The yielding end pieces, *e e*, to regulate the delivery and sustain the wood while being split and prevent the same falling over before being separated by the second cut, as specified.

In witness whereof I have hereunto set my signature this 13th day of September, 1859.

W. L. WILLIAMS.

Witnesses:
LEMUEL W. SERRELL,
CHAS. H. SMITH.